United States Patent
Liao (10) Patent No.: US 6,254,025 B1
(45) Date of Patent: *Jul. 3, 2001

(54) WIRE HOARDING BOX

(76) Inventor: Sheng Hsin Liao, No. 10, Alley 38, Lane 229, San Chun St., Shu Lin Jen, Taipei Hsien (TW)

(*) Notice: Subject to any disclaimer, the term of this patent is extended or adjusted under 35 U.S.C. 154(b) by 0 days.

This patent is subject to a terminal disclaimer.

(21) Appl. No.: 09/377,421

(22) Filed: Aug. 20, 1999

(51) Int. Cl.$^7$ .................................................. B65H 75/48
(52) U.S. Cl. ............................... 242/378.1; 242/385.1; 439/501
(58) Field of Search .................. 242/378.1, 388.1, 242/388.5, 385.1, 917; 191/12.4; 439/164, 501, 502

(56) References Cited

U.S. PATENT DOCUMENTS

| 5,588,626 | * | 12/1996 | Yang | 242/378.1 |
| 6,056,591 | * | 5/2000 | Liao | 439/501 |

* cited by examiner

*Primary Examiner*—John Q. Nguyen
(74) *Attorney, Agent, or Firm*—Rosenberg, Klein & Lee (57) ABSTRACT

A wire hoarding box comprises a case, a rotary wheel, a spiral spring, and a communication wire received therein for connecting two communication devices. The case has two sub-cases assembled to each other; each sub-case having a receiving groove. The case has two wire outlets arranged beside the receiving groove, the receiving groove having a pivot shaft. The rotary wheel is arranged within the receiving groove and has a pivot hole by which the pivot shaft is pivotally and rotatably engaged therein. An inner sleeve and an outer sleeve with larger radius extend from the pivot hole such that an annulus groove is formed between two sleeves. The outer sleeve has two slits. The communication wire has a center segment embedded within the two slits and remaining portion wrapped around the outer sleeve. Two ends of the communication wire extrude from the two wire outlets. A spiral spring is arranged on a predetermined position of the case and beside the rotary wheel, one end of the spiral spring fixed on the rotary wheel. The communication wire can be released or rewound when the communication wire is repeatedly pulled out and repeatedly released. Therefore, the wire hoarding box has compact size and is easily assembled.

5 Claims, 12 Drawing Sheets

WIRE HOARDING BOX

FIELD OF THE INVENTION

The present invention relates to a wire hoarding box, more particular to a hoarding box for communication wire by which the communication wire received in the box can be pulled out to desired length without the twisted problem.

BACKGROUND OF THE INVENTION

The present electronic devices such as computer, modem, telephone or fax machine generally uses communication cable connected therebetween to convey signal. To house long communication wire and reserve enough wire for potential use, wire hoarding box is develop to hoard the communication wire. The conventional wire hoarding box generally comprises a case, rotary wheels, a spiral spring, and communication wire received therein for connecting two communication devices. Moreover, the conventional wire hoarding box further comprises a plurality of conductive rings unequal radius on one rotary wheel and a plurality of conductive plates or balls on another rotary wheel to provide sufficient electrical connection between the two communication devices when the rotary wheel are rotated. However, the above-mentioned wire hoarding box has complicated structure and the communication wire received therein may be subjected to excessive strain exerted by the spiral spring.

It is an object of the present invention to provide a simple-structure and easy-assemble wire hoarding box wherein a rotary wheel is arranged within a groove of a case. The rotary wheel has one surface for the wrapping of communication wire and another surface is provided with a spiral spring, thus reducing the size of the wire hoarding box and simplifying the assembling of the wire hoarding box.

It is another object of the present invention to provide a wire hoarding box, which can be operated by alternative operation to pull out or rewind the communication wire. The rotary wheel is provided with swing plate and rag wheel such that the communication wire can be released or rewound when the communication wire is repeatedly pulled out and repeatedly released.

The various objects and advantages of the present invention will be more readily understood from the following detailed description when read in conjunction with the appended drawing, in which:

DETAILED DESCRIPTION OF THE PREFERRED EMBODIMENT

Figure 1:
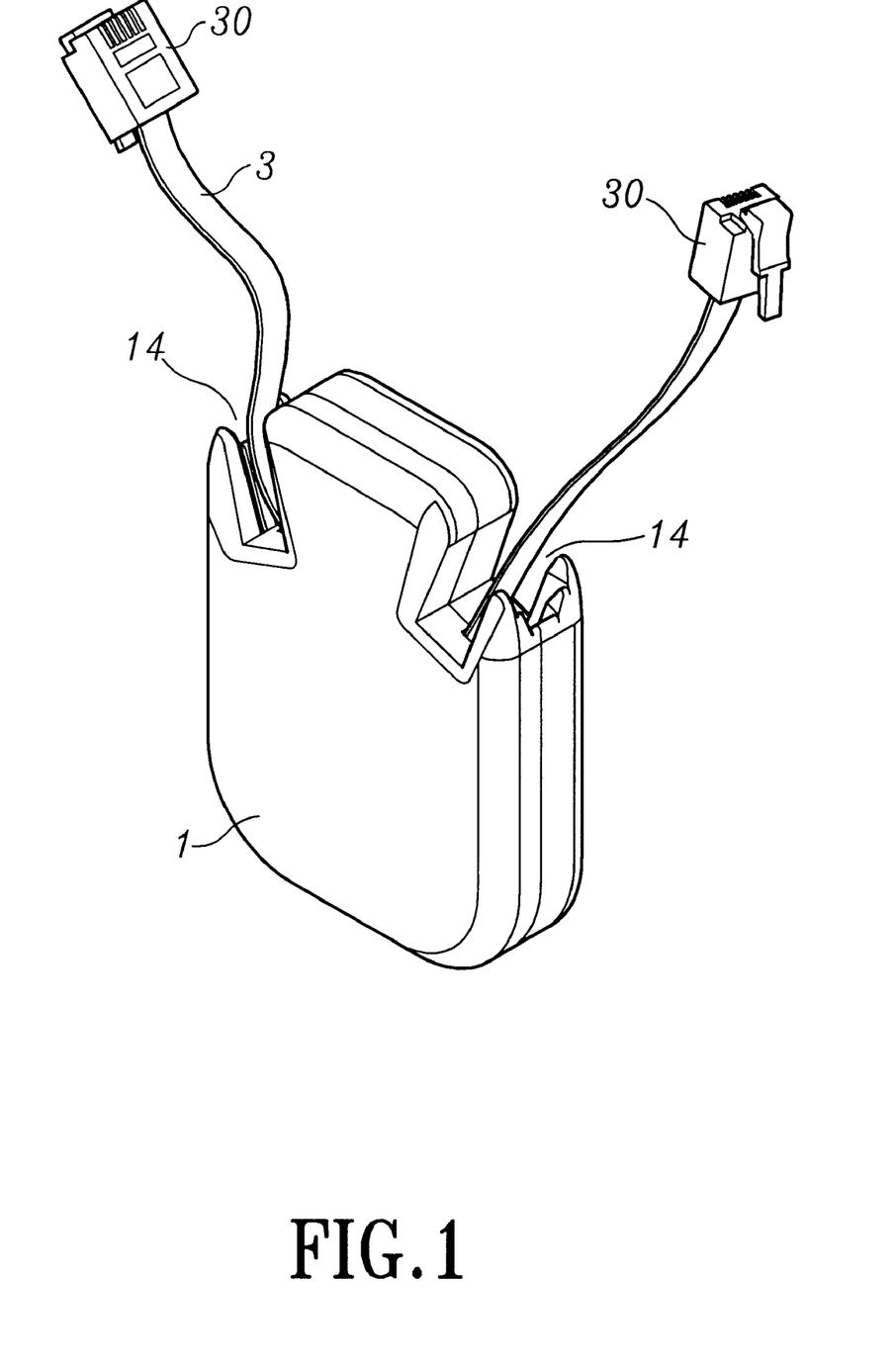
FIG. 1 is the perspective view of the present invention.
Figure 2:
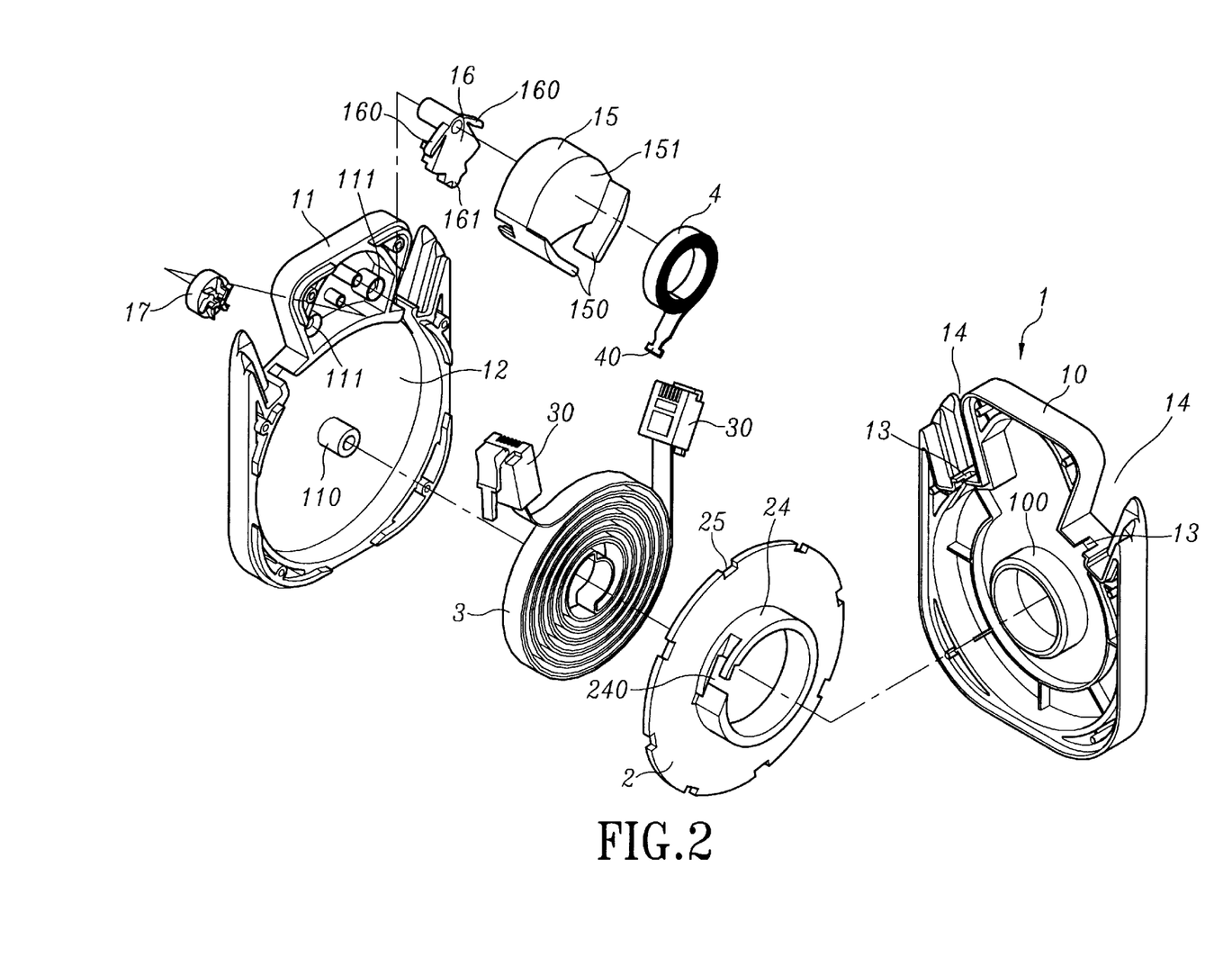
FIG. 2 is the exploded view of the present invention.

FIGS. 1 and 2 show the perspective view and exploded views of the wire hoarding box according to a preferred embodiment of the present invention. The wire hoarding box according to a preferred embodiment of the present invention comprises a case 1, a rotary wheel 2, a spiral spring 4, and a communication wire 3 received therein for connecting two communication devices.

Figure 3:
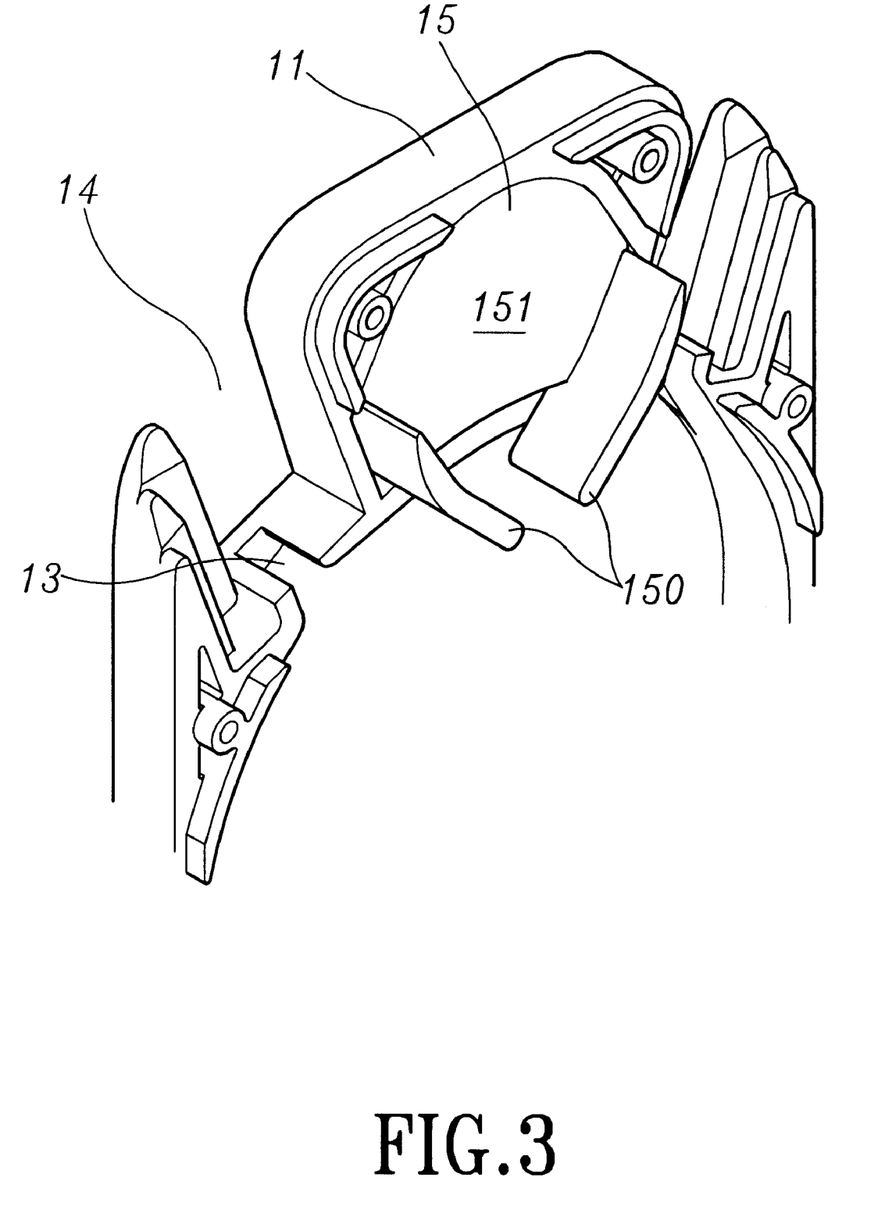
FIG. 3 is partially exploded view showing the integrally formed bearing stage according to the present invention.
Figure 4:
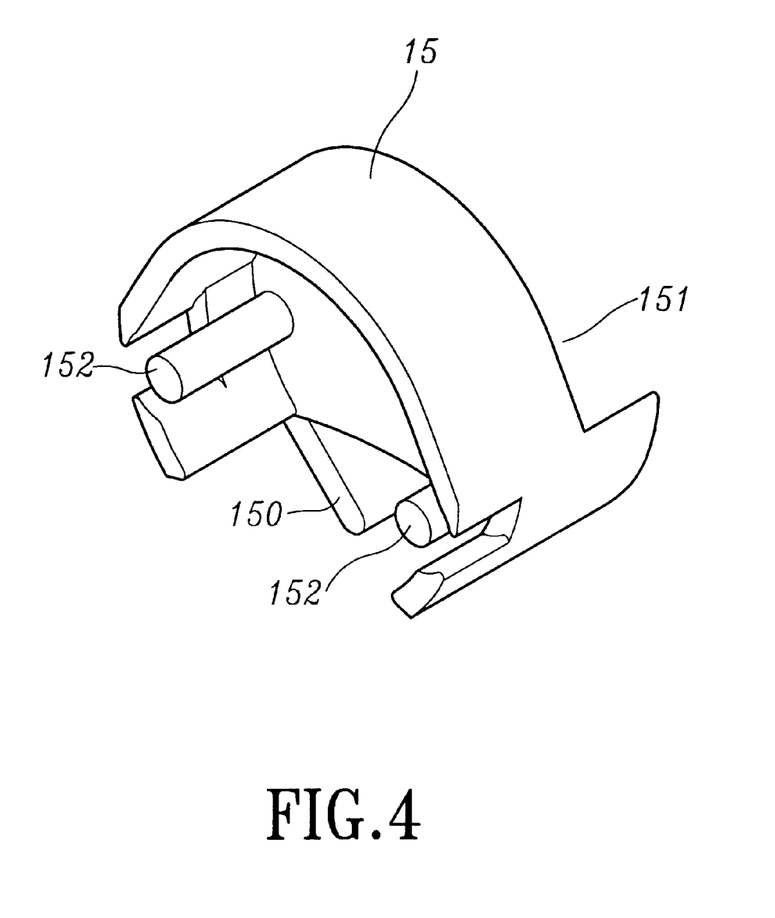
FIG. 4 is the bottom view of the bearing stage according to the present invention.

The case 1 comprises two sub-cases 10 and 11 assembled to each other. Each sub-case 10 (11) has a receiving groove 12. The case 1 has two wire outlets 13 and dents 14 on two lateral sides thereof for exposing the communication wire 3 and housing the plug 30 of the communication wire 3, respectively. A pivot shaft 110 is arranged on one sub-case 11 and a bushing 100 with radius larger than that of the pivot shaft 110 is arranged on another sub-case 10. As shown in FIG. 3, the sub-case 11 has a bearing stage 15 beside the receiving groove 12, which has two blocking plates 150 projecting from both sides thereof. By the blocking plates 150, the spiral spring 4 is retained within a chamber 151 formed between the blocking plates 150 and the wall of the case 1. More particularly, the bearing stage 15 is assembled on the case 1 by inserting an insertion pole 152 on the bottom thereof into a corresponding insertion hole 111 on the sub-case 11.

Figure 5:
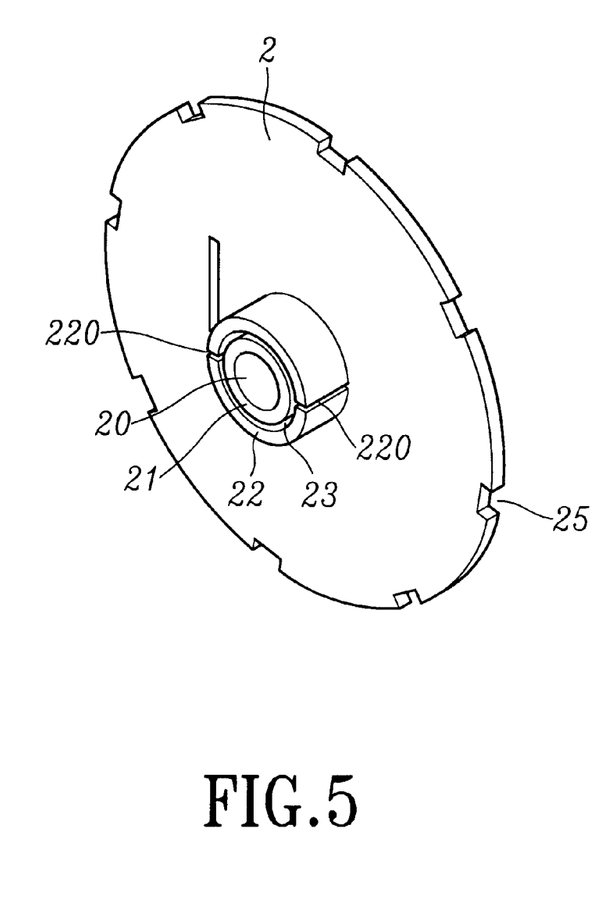
FIG. 5 is the structure of another surface of the rotary wheel.

As shown in FIG. 5, the rotary wheel 2 has a pivot hole 20 at the center thereof, by which the pivot shaft 110 is pivotally and rotatably engaged therein. An inner sleeve 21 and an outer sleeve 22 of larger radius and with two slits 220 are extended from the pivot hole 20 such that an annulus groove 23 is formed between two sleeves 21 and 22. The center segment of the communication wire 3 is embedded within the two slits 220, the remaining portion of the communication wire 3 is wrapped within the annulus groove 23 and around the outer sleeve 22. Moreover, an outer jacket 24 is arranged in another side of the rotary wheel 2 and an inner jacket 100 is arranged within the sub case 10 and pivotally connected to the outer jacket 24. The outer jacket 24 has an embedding groove 240 thereon for locking a hook end 40 of the spiral spring 4. When the rotary wheel 2 is rotated, the spiral spring 4 is wrapped around the outer jacket 24 to generate the required resilient force for the communication wire 3.

Figure 6:
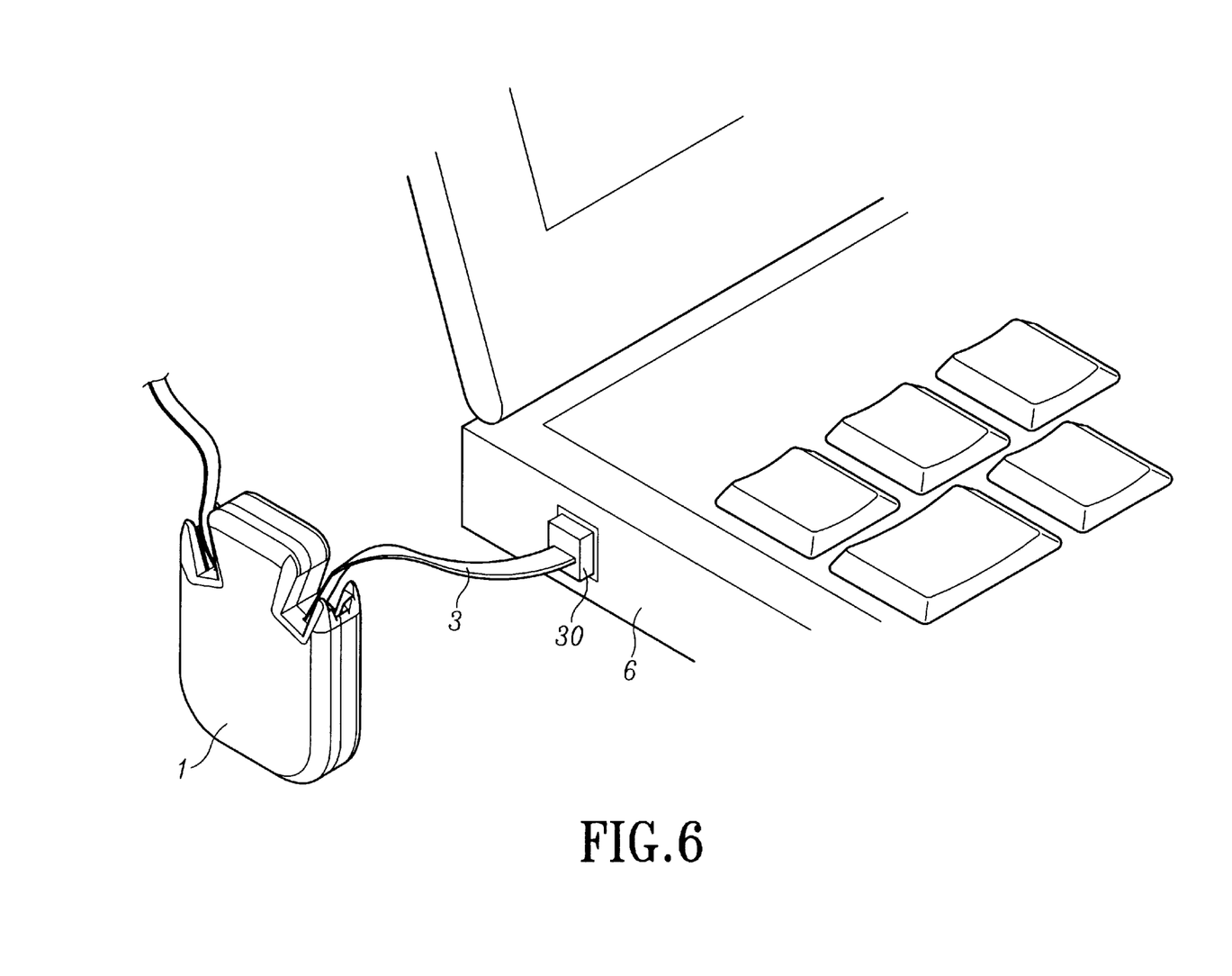
FIG. 6 is the application of the present invention to notebook computer.

As shown in FIG. 6, the two plugs 30 received within the dents 14 are pulled out from the dents 14 and a desired length of the communication wire 3 is extracted. The plugs 30 can be plugged into, for examples, the notebook computer 6 and the network socket, as shown in FIG. 6. By the resilient force provided by the spiral spring 4, the communication wire 3 is kept to have certain strain to minimize the length of exposing wire, thus prevent the twisted problem.

Figure 7:
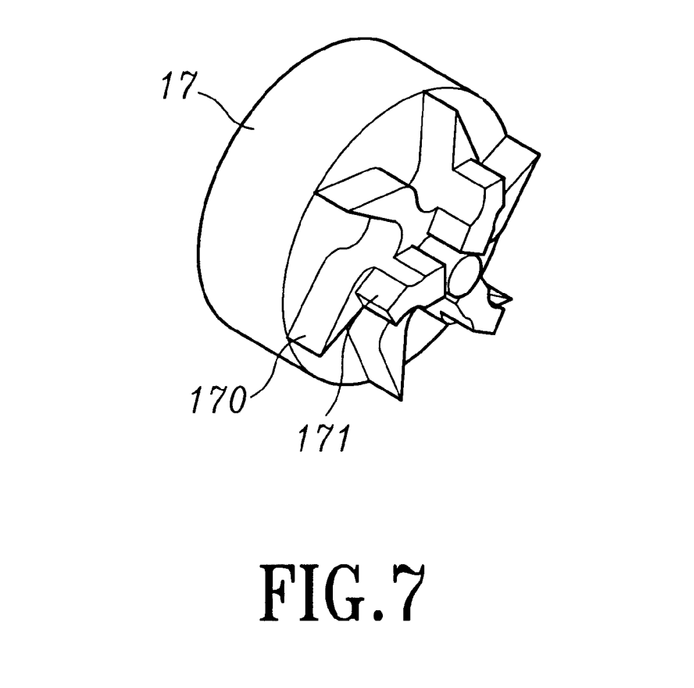
FIG. 7 shows the structure of the rag wheel according to the present invention.
Figure 8:
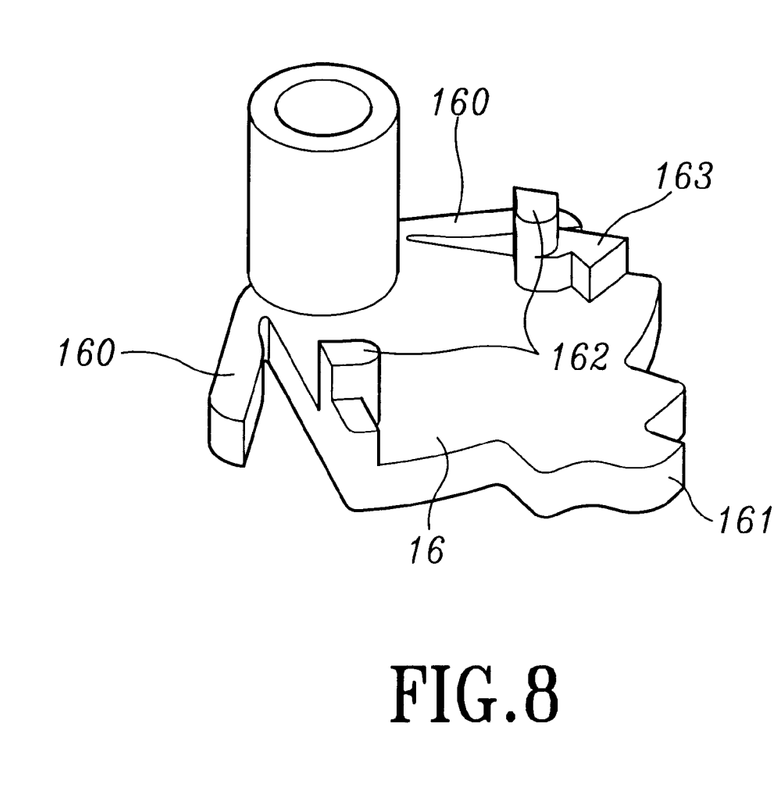
FIG. 8 is the structure of another surface of the swing plate.

Moreover, a swing plate 16 and a free-running rag wheel 17 are provided on the bearing stage 15 beside the rotary wheel 2. The swing plate and the rag wheel 17 are engaged and stacked together. The rotary wheel 2 has a plurality of engaging grooves 25 on the perimeter thereof. The swing plate 16 has two elastic plates 160 extended slantingly from the axis thereof and being in contact with the wall of the case. The swing plate 16 has tongue 161 contacting the perimeter of the rotary wheel 2 and being able to embed into the engaging grooves 25. As shown in FIG. 7, the rag wheel 17 has a plurality of ratchets 170 and a locking block 171 is provided for every two f ratchets 170. As shown in FIG. 8, the swing plate 16 has click 162 on the bottom side adjacent to the free-running rag wheel 17, which is engaged into the ratchets 170 when the rag wheel 17 is rotated. The click 162 has an engaging block 163 corresponding to the locking block 171.

Figure 9:
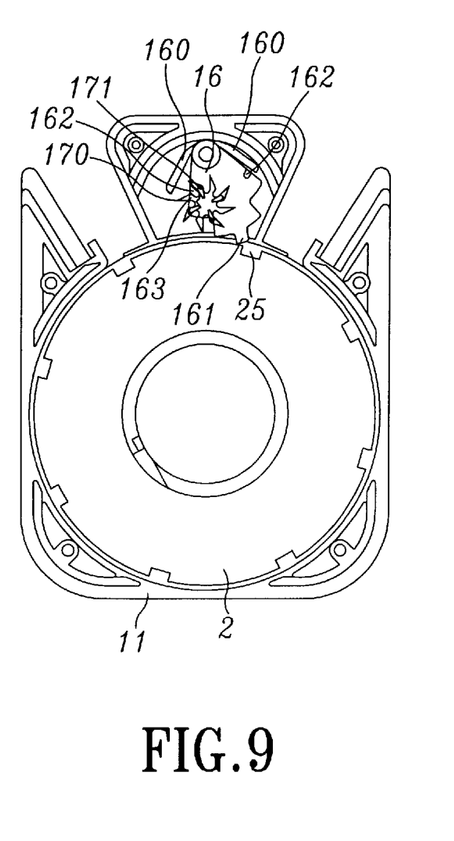
FIG. 9 shows the relationship between the swing plate and the rag wheel in an initial state.
Figure 10:
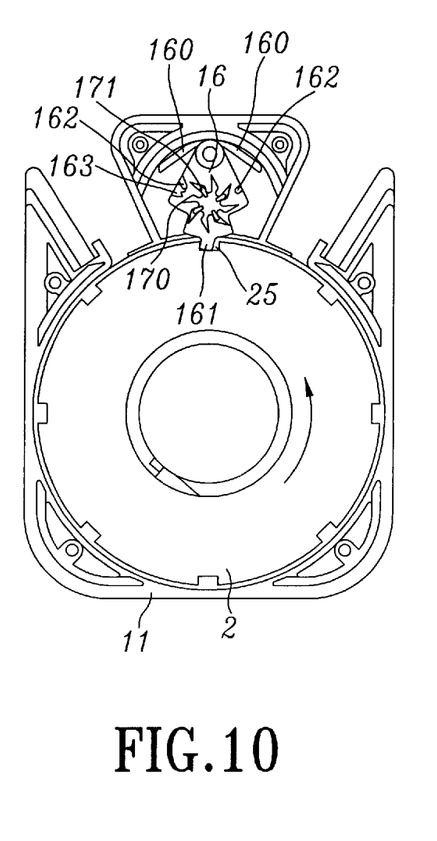
FIG. 10 is a plan view showing the relationship between the swing plate and the rag wheel when the communication wire is pulled out.
Figure 11:
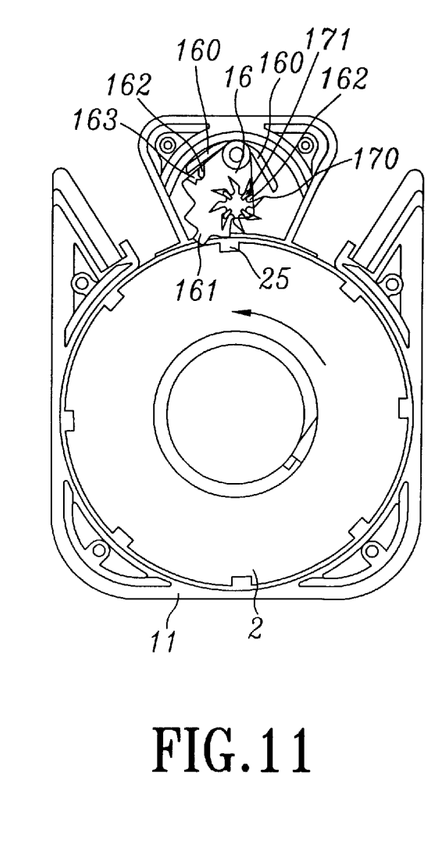
FIG. 11 is a plan view showing the relationship between the swing plate and the rag wheel when the communication wire is continued to pull out.
Figure 12:
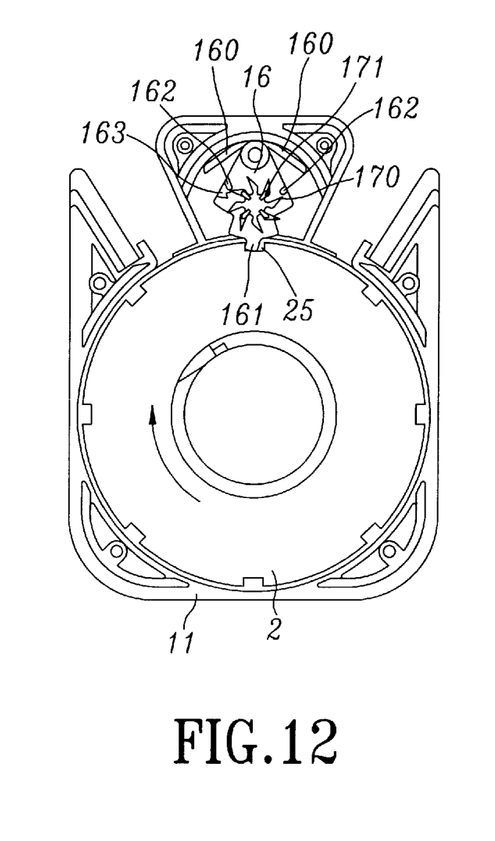
FIG. 12 is a plan view showing the relationship between the swing plate and the rag wheel when the communication wire is released.
Figure 13:
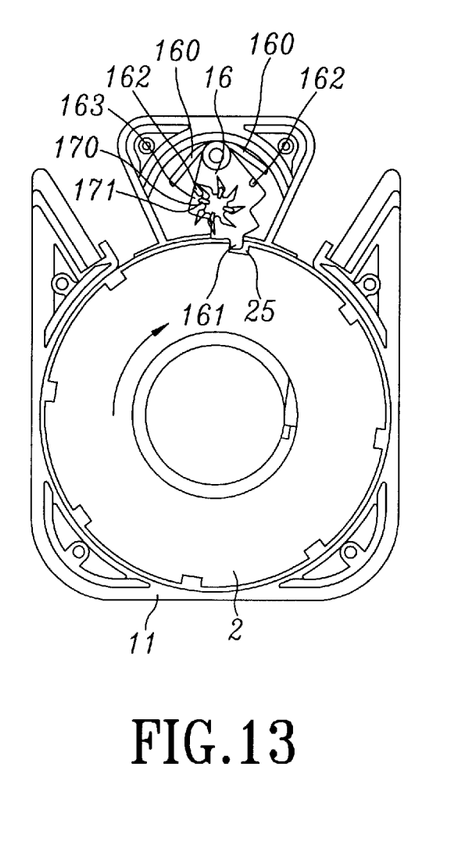
FIG. 13 is a plan view showing the relationship between the swing plate and the rag wheel when the communication wire is blocked.
Figure 14:
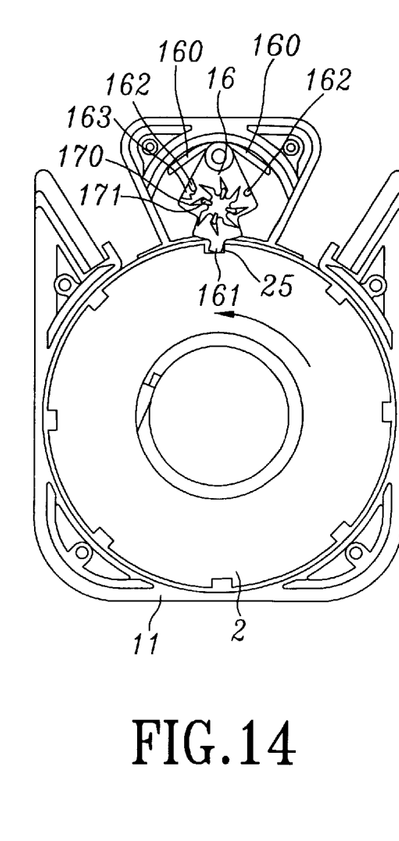
FIG. 14 is a plan view showing the relationship between the swing plate and the rag wheel when the communication wire is pulled out again.
Figure 15:
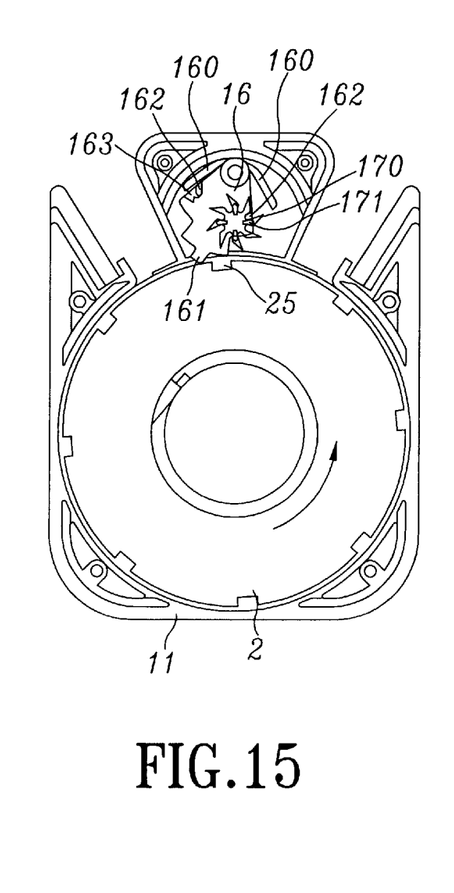
FIG. 15 is a plan view showing the relationship between the swing plate and the rag wheel when the communication wire is continued to pull out.
Figure 16:
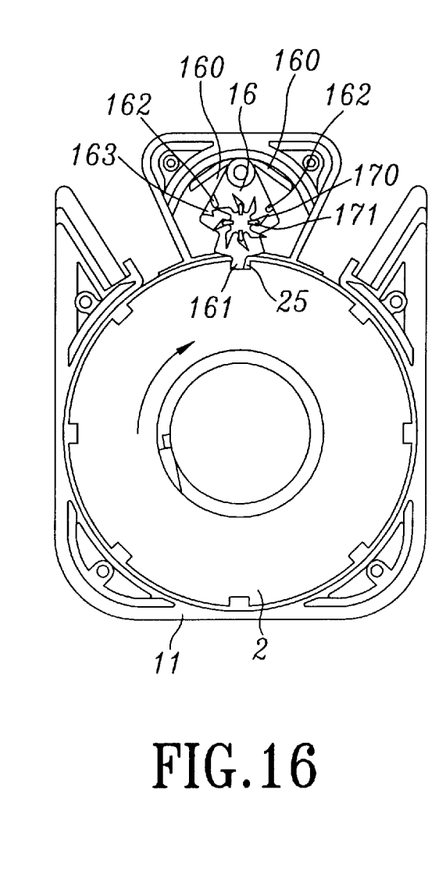
FIG. 16 is a plan view showing the relationship between the swing plate and the rag wheel when the communication wire is again released to rewind.
Figure 17:
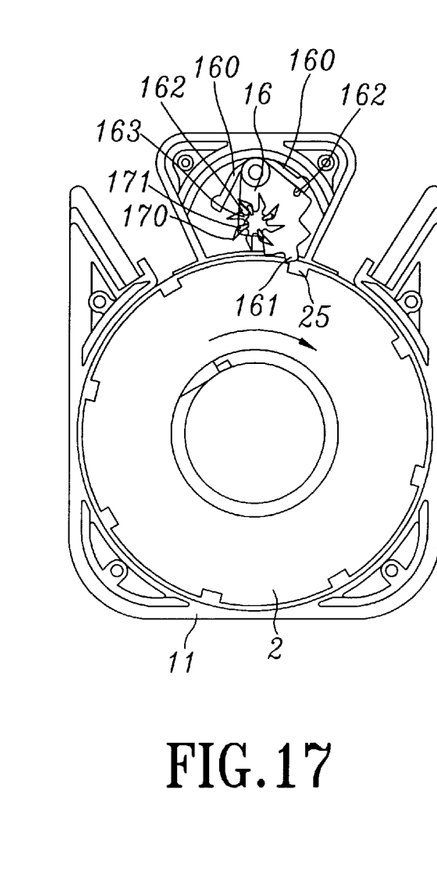
FIG. 17 is a plan view showing the relationship between the swing plate and the rag wheel when the communication wire is continued to rewind.

FIG. 9 shows the initial state of operation of the inventive wire hoarding box wherein the swing plate 16 is swung rightward and only the left click 162 is engaged into the ratchets 170 on left side of the rag wheel 17. When the communication wire 3 is extracted, the rotary wheel 2 is rotated in counter clockwise direction to a predetermined position. The right elastic plates 160 pushes the tongue 161 into the engaging grooves 25 and the swing plate 16 is accordingly swung leftward. As shown in FIGS. 10–11, the right click 162 pushes the ratchets 170 half pitch and locks the ratchets 170. In this state, the rotary wheel 2 rotates freely in counter clockwise direction. As shown in FIGS. 12 and 13, when the communication wire 3 is released and rewound, the swing plate 16 is rebounded by the resilient force of the left elastic plates 160 and pushes the tongue 161 into the engaging grooves 25. The rotary wheel rotated in clockwise direction is pushed rightward. At this time, the left click 162 pushes the ratchets 170 half pitch and locks the ratchets 170. The engaging block 163 blocks the locking block 171 of the rag wheel 17 to retain the rag wheel 17. The swing plate 16 can not be swung rightward and the rotary wheel 2 is clamped such that the communication wire 3 can not be rewound. Afterward, as shown in FIGS. 14 and 15, if the communication wire 3 is further pulled out, the swing plate 16 is again pushed leftward and has same position relationship with the rag wheel 17 as shown in FIG. 11. That is, the rotary wheel 2 can be rotated in counter clockwise direction arbitrarily to extract the communication wire 3. However, no matter how long the communication wire 3 is extracted, once the communication wire 3 being released, the swing plate 16 is swung rightward to the initial state as shown in FIG. 9. This situation is different to that shown in FIG. 13 wherein only the engaging block 163 is pushed and engaged with the left ratchets 170 while the engaging block 163 does not lock the locking block 171. Therefore, the rotary wheel 2 rotates freely in clockwise direction to rapidly rewind the communication wire 3.

In a word, in the inventive wire hoarding box, the click 162 push the rag wheel 17 to move a pitch distance when the swing plate 16 is swung rightward and leftward, the locking block 171 is provided per every two ratchets 170. Therefore, no matter how long the communication wire 3 has been pulled out, the communication wire 3 can be clamped when the communication wire 3 is firstly pulled out and firstly released. The communication wire 3 can be rewound when the communication wire 3 is secondly pulled out and secondly released. That is, by repeated dragging and releasing, user can easily pull out or rewind the communication wire 3.

Figure 18:
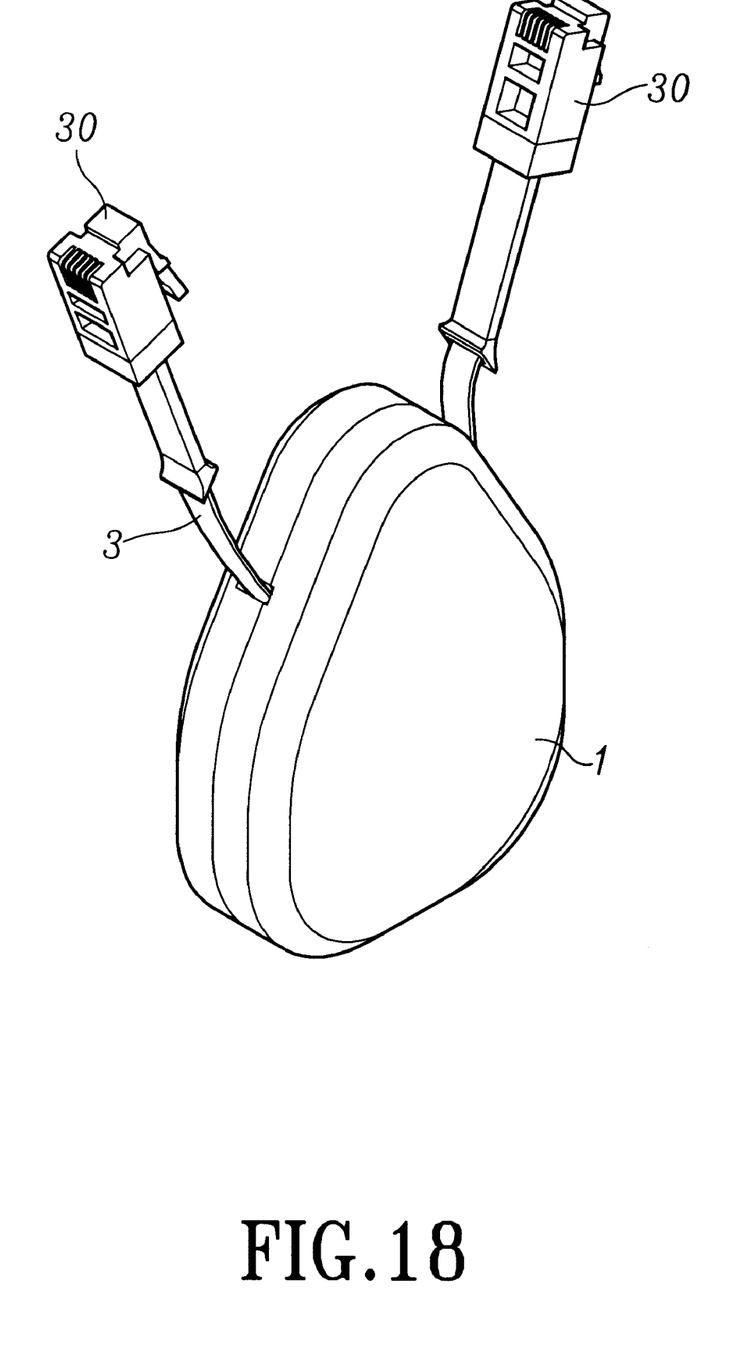
FIG. 18 shows another embodiment of the present invention wherein the shape is modified.
Figure 19:
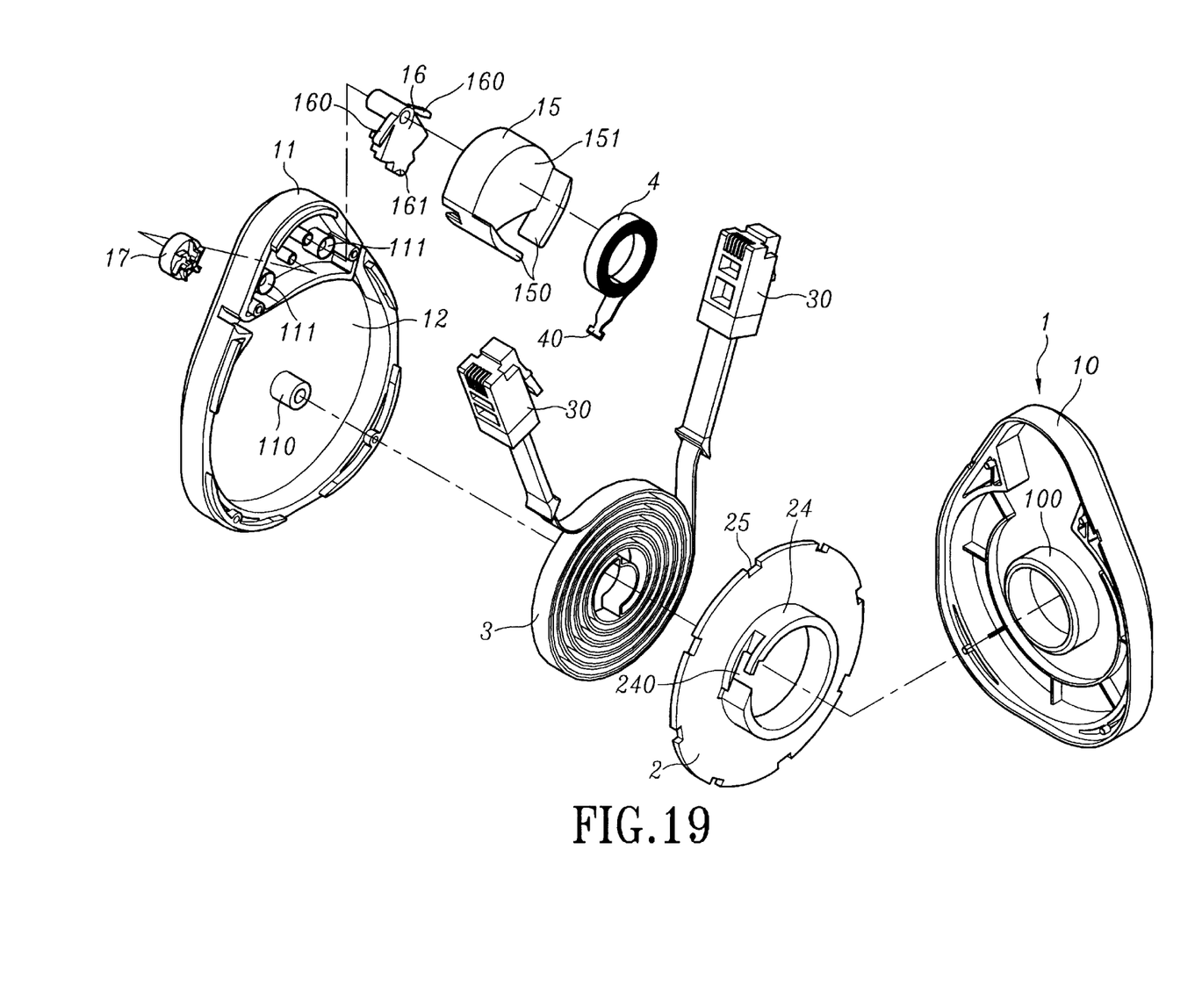
FIG. 19 shows the exploded view of the embodiment in FIG. 18.
Figure 20:
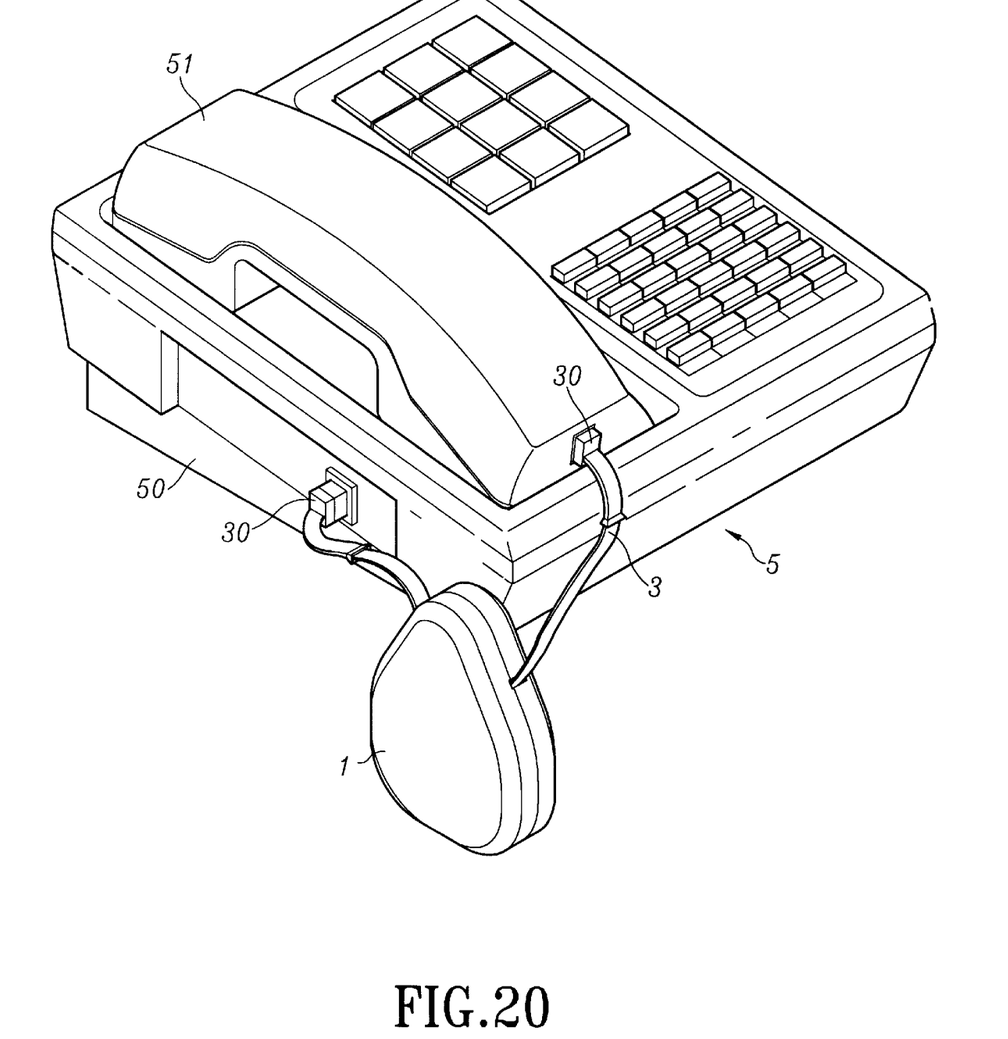
FIG. 20 is the application of the present invention on telephone.

The present invention is intended to provide a compact and easily assembled wire hoarding box as shown in FIG. 1. However, the shape of the inventive wire hoarding box is not limited in the illustrative rectangular shape. As shown in FIGS. 18 and 19, the shape of the inventive wire hoarding box can also be oval shape. Moreover, by repeated dragging and releasing, user can easily pull out or rewind the communication wire of the inventive wire hoarding box. Therefore, the inventive wire hoarding box is not only applicable to connection between the main unit 50 of telephone 5 and the handset 51 shown in FIG. 20, but also to the connection between the notebook computer 6 and network socket as shown in FIG. 6.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A wire hoarding box comprising:
    a case having two sub-cases assembled to each other; each said sub-case having a receiving groove formed therein for forming a cavity of said case; said case having two wire outlets disposed adjacent said cavity, said receiving groove of a first of said sub-cases having a pivot shaft extending therefrom;
    a rotary wheel arranged within said cavity and having a pivot hole through which said pivot shaft is pivotally and rotatably engaged therein; an inner sleeve and an outer sleeve with a larger radius extended from a side of said rotary wheel and circumscribing said pivot hole such that an annular groove is formed between said two sleeves; said outer sleeve having two slits formed therethrough;
    a communication wire having a center segment passed around said inner sleeve within said annular groove with opposing portions thereof passing out through said two slits, a remaining portion of said communication wire being wrapped around said outer sleeve; two ends of said communication wire extruding from said two wire outlets;
    a spiral spring arranged on a predetermined position of said case and beside said rotary wheel, one end of said spiral spring fixed on said rotary wheel.

2. The wire hoarding box as in claim 1, wherein a swing plate and a rag wheel are provided on said case and beside said rotary wheel; said swing plate and said rag wheel being engaged and stacked together; said rotary wheel having a plurality of engaging grooves on the perimeter thereof; said swing plate having two elastic plates extending slantingly from an axis thereof and being in contact with a wall of said case; said swing plate having a tongue contacting the perimeter of said rotary wheel and being able to embed into said engaging grooves; said rag wheel having a plurality of ratchets and a locking block being provided for every two of said ratchets; said swing plate having a click on a bottom side adjacent to said rag wheel that pushes said ratchets and is engaged into said ratchets when said swing plate is swung; said click having an engaging block corresponding to said locking block.

3. The wire hoarding box as in claim 1, wherein said case has a bearing stage disposed adjacent said cavity, said bearing stage having two blocking plates respectively projecting from two sides thereof; a chamber formed between said blocking plates and a wall of said case.

4. The wire hoarding box as in claim 1, wherein an outer jacket is arranged in a side of said rotary wheel opposite to the side with said two sleeves, a second of said sub-cases having an inner jacket formed thereon adjacent to said rotary wheel; said inner jacket being pivotally connected to said outer jacket.

5. The wire hoarding box as in claim 4, wherein one end of said spiral spring has a hook end fixed in an embedding groove of said outer jacket.

* * * * *